(12) United States Patent
Subramanian et al.

(10) Patent No.: US 11,410,097 B2
(45) Date of Patent: Aug. 9, 2022

(54) SYSTEM AND METHOD FOR INTELLIGENT RECRUITMENT MANAGEMENT

(71) Applicant: Titan Data Group Inc., Woodbury, MN (US)

(72) Inventors: Viswanathan Subramanian, Woodbury, MN (US); Pradeep Janakiraman, Chennai (IN); Bharath Kumar Inbasekaran, Woodbury, MN (US); Subhadeep Roy, Woodbury, MN (US); Shankarri Ragavan, Woodbury, MN (US); Madhuvani S, Chennai (IN); Penamakuri V B Abhirama Subramanyam, Chennai (IN); Kona Sirisha, Chennai (IN)

(73) Assignee: Titan Data Group Inc., Woodbury, MN (US)

( * ) Notice: Subject to any disclaimer, the term of this patent is extended or adjusted under 35 U.S.C. 154(b) by 121 days.

(21) Appl. No.: 16/512,979

(22) Filed: Jul. 16, 2019

(65) Prior Publication Data
US 2021/0019688 A1    Jan. 21, 2021

(51) Int. Cl.
*G06Q 10/06* (2012.01)
*G06Q 10/10* (2012.01)

(52) U.S. Cl.
CPC . *G06Q 10/063112* (2013.01); *G06Q 10/1053* (2013.01)

(58) Field of Classification Search
CPC .............................. G06Q 10/06; G06Q 10/10
USPC ....................................................... 705/7.14
See application file for complete search history.

(56) References Cited

U.S. PATENT DOCUMENTS

| | | | |
|---|---|---|---|
| 5,197,004 A | 3/1993 | Sobotka et al. | |
| 7,711,573 B1* | 5/2010 | Obeid | G06Q 10/1053 705/321 |
| 2006/0287970 A1 | 12/2006 | Chess et al. | |
| 2009/0276415 A1 | 11/2009 | Dane | |
| 2013/0046704 A1 | 2/2013 | Patwa et al. | |
| 2013/0290206 A1* | 10/2013 | Desai | G06Q 10/063112 705/321 |
| 2019/0019160 A1* | 1/2019 | Champaneria | G06F 40/30 |

(Continued)

*Primary Examiner* — Nga B Nguyen
(74) *Attorney, Agent, or Firm* — Hamre, Schumann, Mueller & Larson, P.C.

(57) ABSTRACT

The present invention provides an intelligent recruitment management system, method and computer program product for performing an automated recruitment process. The system comprises at least one processor (11) configured to execute modules of a recruitment intelligence platform (10), including a true requisition module (12) that parses data from intake forms and outputs a standardized result, analysing historical data of previous requisitions, a resume intelligence module (13) that mines resume and display a formatted output highlighting skills and best fit, cautioning frauds and plagiarism, a submission intelligence module (14) that enables candidates to submit relevant information via a unique link, generated by the true requisition module and a profile sourcing module (15) that invokes an RPA pipeline where a classification model automatically determines job matches and prompts the recruiters to select relevant candidates. The recruitment intelligence platform (10) enables recruiters to keep track of every step of the automated recruitment process.

6 Claims, 3 Drawing Sheets

(56) References Cited

U.S. PATENT DOCUMENTS

| | | | |
|---|---|---|---|
| 2019/0114593 A1* | 4/2019 | Champaneria | G06F 16/3325 |
| 2019/0138645 A1* | 5/2019 | Zhang | G06F 16/332 |
| 2019/0156292 A1* | 5/2019 | Wehrle | G06F 40/174 |
| 2019/0220824 A1* | 7/2019 | Liu | G06Q 10/1053 |
| 2019/0318315 A1* | 10/2019 | Clark-Lindh | G06Q 10/063112 |

* cited by examiner

SYSTEM AND METHOD FOR INTELLIGENT RECRUITMENT MANAGEMENT

FIELD OF THE INVENTION

The present invention generally relates to electronic recruiting and candidate matching. Specifically, the present invention is related to a system and method for applying natural language processing and further heuristics for automatic document parsing of job specifications and candidate resumes and thereby enabling higher productivity for recruitment teams.

BACKGROUND OF THE INVENTION

The recruitment ecosystem at any enterprise level consists of multiple parties where an enterprise releases their hiring requirements to vendor managers who in turn depend on the sourcing communities to select the best candidates. The sourcing community comprehends the requirement, which is mostly based on explicit mentions from the business. The suppliers find the best match with a negotiated rate and the candidates are signed up for discussion with the hiring managers. The recruitment ecosystem has its own challenges: such as, varied interpretation of the job requirements by the sourcing community including human errors; inefficiency in assimilating and articulating the job descriptions by recruiter's due to varied experience levels; inability to extrapolate the actual need based on the lessons learned and due to rapid technological changes; inability to source most qualified candidates in fastest possible time; and causing confusions for the hiring manager with respect to the befitting match prior to the discussion with the candidates. The challenges are the foundational gaps rampant in the sourcing ecosystem at the enterprise level which can be solved using the correct information flow across all stakeholders within the ecosystem.

In recent years the number of technology companies attempting to solve issues in the recruiting process has grown tremendously. The proliferation of web-based technologies includes a wide range of applicant tracking systems, data extraction methods, new search technologies, and processes to match the appropriate job seekers with open positions. Applicant tracking systems collect job description and job seeker (resume) information, but they do not have precise matching between the required elements of the job specification and the skills and experience of the job seeker.

Data extraction methods are based on individual words which do not capture nuances in various types of skills and experiences. Extraction also relies upon large databases of verified data. Most extraction technology providers do not have adequate databases of verified data or high-quality validation. Existing search and matching technologies mostly rely on keywords linked with Boolean operators to launch searches and retrieve search results, but using keyword-based searches does not provide precise matching results. The keywords can be taken out of context and result in poor search matches.

Another issue with resumes on currently available online job sites is the proliferation of falsified resumes in their database. Some of the resumes may contain incorrect or fraudulent information, an inflated number of years of experience, and inflated skills. Existing systems are not capable of automatically verifying the information provided on a resume or an application form, such as to do a preliminary correlation between various components of a resume (for example, between skills and experience and/or objective and education) and then flag any mismatches.

Several systems are available in the state of the art for extracting information such as skills and/or experience from resumes and matching such information with prospective employer's needs.

US patent application 20090276415 provides a system for automatically processing candidate resumes and job specifications expressed in natural language into a common, normalized, validated form. The natural language expression of the candidate resumes and job specifications are analyzed to extract elements expressed in candidate resumes and job specifications. Each extracted element is validated against a database of valid words or phrases. The extracted, validated elements are converted for each candidate resume or job specification into the corresponding set of synonymous elements. The synonymous elements are expressed in a common form used across all candidate resumes and job specifications processed by the method. A set of candidate resumes is matched with a corresponding job specification by comparing the set of elements expressed in common form for the resumes with the set of elements expressed in common form for the job specification.

US patent application 20130046704 discloses a computer-implemented method and system for managing recruitment interactions provides a recruitment interaction management platform (RIMP) that acquires profile information associated with multiple roles from multiple users and recruitment advisory information from one or more of the users and/or first external sources via a network, for creating one or more candidate profiles for candidates. The RIMP matches the candidate profiles with a recruiting requirement acquired from one or more of the users or second external sources via the network, based on matching criteria to generate a candidate list that matches the recruiting requirement; dynamically assigns a rating to each of the users based on their roles, the profile information, an outcome of a transaction performed between recruiters and the candidates, and predetermined rating criteria associated with the roles; and allocates incentives to each of the users based on the roles, the assigned rating, and predetermined incentive allocation criteria.

US patent application 20060287970 discloses a system for automatically screening resumes and/or job/admission applications for false information as well as for specific factors that make a particular candidate non-suitable for a particular job or school. The tool can also be used to generate questions that could be asked of a specific candidate based on the information provided in the resume. Such a tool may optionally include a database preconfigured with some of the information pertinent to a specific field/group of jobs. It can also optionally include the list of well-known companies hiring candidates with specific backgrounds, the contact e-mail and the information of the skills that could be utilized by each company in a given year.

US patent document 5197004 provides a method and apparatus for automatically selecting the job category or categories within which an applicant should be placed using only the applicant's resume is disclosed. The invention accepts as input a computer-readable version of the applicant's resume. An extractor, using a predetermined list of word patterns, the word patterns having been selected as indicative of skill in different job categories and assigned a weight commensurate with its value as an indicator of skill in a particular job category or categories, locates those words and word groups found in the resume that match the patterns. The weights of these words or word groups are then summed for each particular job category and the job category or categories having the highest point totals are selected as the most appropriate areas within the applicant should be placed.

Thus there is a need for an intelligent system which would improve the efficiency and throughput of the recruiting team by automating processes thereby reducing human errors. The present invention provides an intelligent automated recruiting management system that creates an unambiguous interpretation of the job requirement eliminating human errors, uses machine learning to understand patterns and trends to uncover deep insights, reduces the sourcing time for the recruiters by automating the process with minimal human supervision, elevates throughput across all stakeholders, reduces sourcing cost as it mimics experienced recruiters making the adoption easier, and keeps detailed track of all recruitment stages. All of the above cited prior art documents show some of the features of the present intelligent recruitment management system, but none shows or suggests the particular combination of features in the present invention.

OBJECTIVES OF THE INVENTION

In view of the deficiencies of the prior art, the primary objective of the present invention is to provide an intelligent recruitment management system that creates unambiguous interpretation of the job requirement eliminating human errors.

Another objective of the present invention is to provide an intelligent recruitment management system that uses machine learning to understand patterns and trends to uncover deep insights.

Still another objective of the present invention is to provide an intelligent recruitment management system which reduces the sourcing time for the recruiters by automating the process with minimal human supervision.

Yet another objective of the present invention is to provide an intelligent recruitment management system which keeps detailed track of all recruitment stages.

Accordingly, it is highly desirable to provide an intelligent recruitment management system that understands the key requirements for a job opening from the intake forms and resumes. The key skills shown to the recruiters are not only limited to the information available on the intake form and resume, but also from the historical requirements of the department which has the job opening. By using this logic of interpreting the intake form and the historical data, the exact critical skills necessary for the current opening is found and this information is available to all the recruiters and sourcers in the organization, thereby enhancing the throughput and effectivity of sourcers and recruiters irrespective of their experience levels.

Furthermore, other desirable features and characteristics of the systems and methods of the herein described exemplary embodiments will become apparent from the subsequent detailed description and the appended claims, taken in conjunction with the accompanying drawings and the foregoing technical field and background.

SUMMARY OF THE INVENTION

The present invention provides an intelligent recruitment management system for performing an automated recruitment process, comprising of at least one integrated processor configured to execute modules of a recruitment intelligence platform (10) accessible via a network. The modules of said recruitment intelligence platform (10) include a true requisition module (11) that parses data from intake forms and outputs a standardized result, and also analyzes previous requisitions and learns historical actions performed on them. A resume intelligence module (12) mines resumes and displays a formatted output highlighting skills and best fit, cautioning frauds and plagiarism, and interprets recruiters actions and retrains itself for higher accuracy. A submission intelligence module (13) enables candidates to submit relevant information via a secured and unique link generated by the true requisition module (11). A profile sourcing module (14) uses predictive modelling to source and pipeline resumes for new requisitions based on the previous trends of job requirement. The recruitment intelligence platform (10) enables recruiters to keep track of every step of the automated recruitment process.

In an embodiment of the present invention, wherein said recruitment intelligence platform (10) acquires resumes from multiple sources including third-party resume platforms, resumes staged by sourcers, and resumes downloaded from the internet.

An embodiment of the present invention, provides the method of performing an automated recruitment process by the intelligent recruitment management system, comprising steps of: providing a recruitment intelligence platform (10) to recruiters and candidates via a network; receiving an intake form received from a vendor management system by the recruiter; processing the intake form in a true requisition module (11) of the recruitment intelligence platform (10), which generates an intelligent snapshot of the intake form; downloading resumes from the internal databases, recruiters historical archives and third-party resume platforms; processing the resumes by a resume intelligence module (12) of the recruitment intelligence platform (10), which filter out resumes based on contents, fraud, plagiarism and generates a match factor with warnings (if any); sending a unique link through the true requisition module (11) to prospective candidates of matched resumes, which opens up an application portal with an auto-filled form; submitting the application by attaching relevant documents by the candidate through a submission intelligence module (13) of the recruitment intelligence platform (10); auto-generating a coversheet and RTR (Right To Represent) by the recruitment intelligence platform (10) based on the application submitted by the candidate; intimating the recruiter of the submission of application by the recruitment intelligence platform (10); and submitting the candidate information by the recruiter to a vendor management system.

Figure 1:
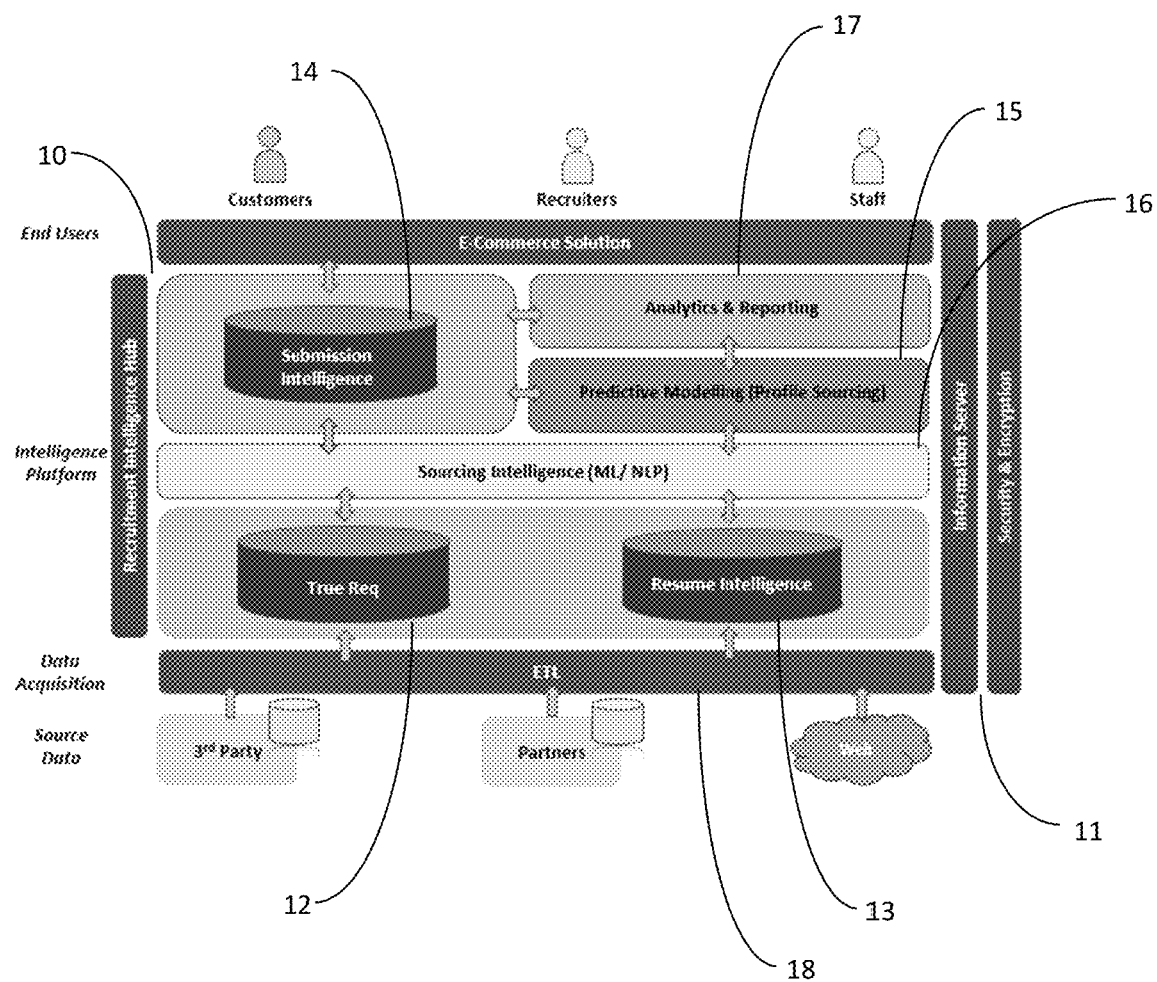
FIG. 1 is a high-level architecture diagram for an intelligent recruitment management system, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION WITH RESPECT TO DRAWINGS

The present invention as embodied by an "Intelligent recruitment management system and method thereof" succinctly fulfils the above-mentioned need(s) in the art. The present invention has objective(s) arising as a result of the above-mentioned need(s), said objective(s) being enumerated below. In as much as the objective(s) of the present invention are enumerated, it will be obvious to a person skilled in the art that, the enumerated objective(s) are not exhaustive of the present invention in its entirety, and are enclosed solely for the purpose of illustration. Further, the present invention encloses within its scope and purview, any structural alternative(s) and/or any functional equivalent(s) even though, such structural alternative(s) and/or any functional equivalent(s) are not mentioned explicitly herein or elsewhere, in the present disclosure. The present invention therefore encompasses also, any improvisation(s)/modification(s) applied to the structural alternative(s)/functional alternative(s) within its scope and purview. The present invention may be embodied in other specific form(s) without departing from the spirit or essential attributes thereof.

Throughout this specification, the use of the word "comprise" and variations such as "comprises" and "comprising" may imply the inclusion of an element or elements not specifically recited.

The present invention aims to overcome the defects of the existing recruitment process by providing an intelligent recruitment management system that understands the key requirements for a job opening from the information available on the intake forms and resumes, and also from the historical requirements of the department which has the job opening. By using this logic of interpreting the intake form and the historical data, the exact critical skills necessary for the current opening is found and this information is available to all the recruiters and sourcers in the organization. It creates an unambiguous interpretation of job requirement and reduces the manual error of interpreting the skills by 87% and increases the efficiency of the recruiters by 62.2%.

According to the present invention as embodied in FIG. 1, the intelligent recruitment management system for performing an automated recruitment process, comprises of: at least one processor/server (11) configured to execute modules of a recruitment intelligence platform (10) accessible via a network. The modules of said recruitment intelligence platform (10) include: a true requisition module (12), a resume intelligence module (13), a submission intelligence module (14), and a profile sourcing module (15).

The true requisition module (12) parses data from intake forms and outputs a standardized result which is accurate and easy to interpret. Standardized intakes are parsed by machine learning models in a sourcing intelligence module (16) of the recruitment intelligence platform (10) to interpret the actual requirement of a job opening. The intelligent recruitment management system uses NLP (Natural Language Processing) for document parsing. The true requisition module (12) analyses year to date requisitions released for the past three, six or one year and learns historical actions performed on them. The true requisition module (12) increases the efficiency of processing intakes thereby efficiently reducing the requisition prep turn-around time by 60%.

The resume intelligence module (13) is designed to mine resumes and display a formatted output not only highlighting skills and best fit but also cautioning frauds and plagiarism. The resume intelligence module (13) interprets recruiter's actions and retrains itself for higher accuracy by inducing machine learning/artificial intelligence via a sourcing intelligence module (16) of the intelligent recruitment management system.

The submission intelligence module (14) enables candidates to submit relevant information in a secure and automated manner via a secured and unique link generated by the true requisition module (12). The submission intelligence module (14) enables the recruiters while interacting with candidates to fully automate the existing manual due-diligence which includes capturing important candidate information, confidentiality agreement, relevant documents, representation rights, job description, answering pre-screen questions, filled cover sheets along with supporting application information and a well-formatted and a tailor-made resume for a job requirement.

The true requisition module (12) generates a secured and unique link for any processed intake form. This link is a convenient way to interact with prospective candidates without the hassle of back and forth communication via phone, emails, voice messages, SMSs' etc. thereby reducing human errors and increasing the throughput by 70%. The candidate uses the mobile-friendly link to fill up the application as per their own convenience before the link expires. The candidate screening requires them to answer pre-screen questions which the machine enables them to do conveniently and maintaining the integrity by disabling copy-paste and identifying plagiarism. All information is routed through a secure server and only the relevant information is furnished to the prospective employers.

The profile sourcing module (15) uses predictive modelling to source and pipeline resumes for new requisitions based on the previous trends of job requirement which improves the efficiency of sourcing process by 70%. The recruitment intelligence platform (10) enables recruiters to keep track of every step of the automated recruitment process through an analytics & reporting module (17) that utilize analytics to track progress.

In the preferred embodiment of the present invention, wherein said recruitment intelligence platform (10) acquires resumes from multiple sources including third-party resume platforms, resumes staged by sourcers, internal databases, and recruiter's historical archives. The resumes are acquired by a data acquisition module (18) of the intelligent recruitment management system that extracts data from multiple sources and copies onto a common database thereof from where the data is fed to the recruitment intelligence platform (10).

In the preferred embodiment of the present invention, wherein said true requisition module (12) mines and cleans data which is grouped based on different features including but not limited to skills, domain, experience, and title.

In the preferred embodiment of the present invention, wherein said resume intelligence module (13) parses the resumes to uncover deep insights such as but not limited to relevant skills, project experiences, the ratio of development experience to non-development experience, spell checks. The resume intelligence module (13) also creates red flags if a candidate has plagiarized contents, ambiguity, suspicions of fake contents, years of gaps, missing information, employer relevant work history, etc.

In the preferred embodiment of the present invention, wherein said resume intelligence module (13) assigns a score to each resume indicating matches with intake forms and a classification output stating whether a resume is reliable or not. This enables the recruiters to intelligently take required action as in the candidate can be proceeded for further conversation.

In the preferred embodiment of the present invention, said profile sourcing module (15) maintains a pool of resumes downloaded from archives, internal databases that are accessible round the clock. A robotic process automation (RPA) pipeline is invoked where a classification model automatically determines job matches for various clients and prompts the recruiters to select relevant candidates for invoking automated interest emails. At this stage, the recruiters will have insights into the previous candidate submissions to refine their selection. Interest emails will be sent out to the profiles with an enabled link to apply for job through the recruitment intelligence platform (10). The interest email can be of the form of direct application or a referral policy based on the status of the resume on file.

Figure 2:
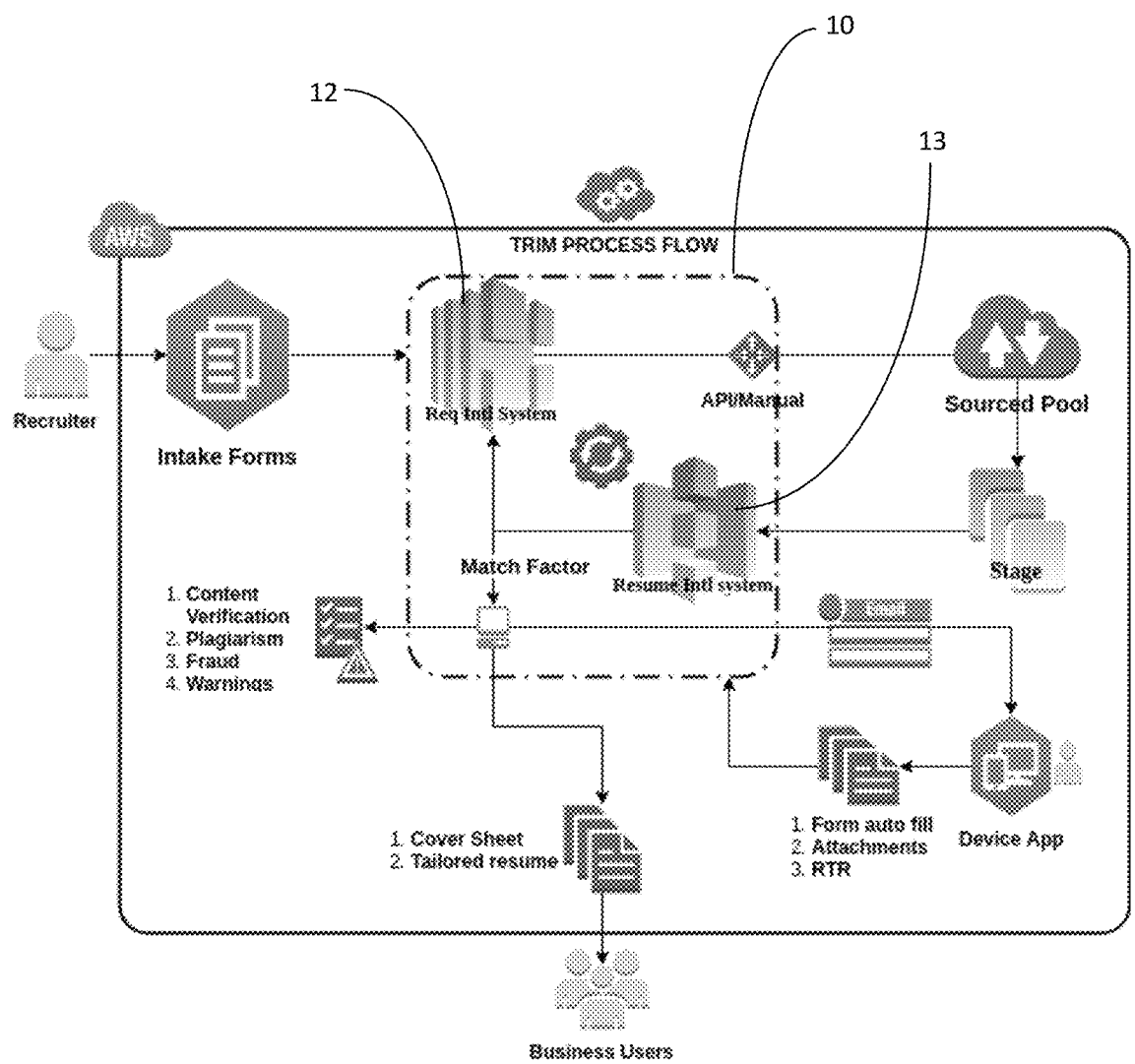
FIG. 2 is a data flow diagram for the intelligent recruitment management system, according to the present invention.

According to the present invention, as embodied in FIG. 2, the process flow for the intelligent recruitment management system is illustrated highlighting the stages at which data transformation, data validation, and error handling are applied as the data transitions from source systems into consuming systems. The intelligent recruitment management system uses NLP (Natural Language Processing) for document parsing and may be hosted on a cloud computing environment such as Amazon Web Services (AWS).

In an embodiment of the present invention, a method of performing an automated recruitment process by the intelligent recruitment management system comprises the steps of:
  a) providing a recruitment intelligence platform (10) via a network to recruiters and candidates, wherein said recruitment intelligence platform (10) comprising at least one processor (11) configured to execute modules thereof;
  b) receiving an intake form from a vendor management system (VMS) and third parties by the recruiter;
  c) processing the intake form in a true requisition module (12) of the recruitment intelligence platform (10), which generates an intelligent snapshot of the intake form;
  d) downloading resumes from the internal databases, recruiters historical archives and from third-party resume platforms;
  e) processing the resumes by a resume intelligence module (13) of the recruitment intelligence platform (10), which filter out resumes based on contents, fraud, plagiarism and generates a match factor with warnings (if any);
  f) sending a unique link through the true requisition module (12) to prospective candidates of matched resumes, which opens up an application portal with an auto-filled form;
  g) submitting the application by attaching relevant documents by the candidate through a submission intelligence module (14) of the recruitment intelligence platform (10);
  h) auto-generating a coversheet and RTR (Right To Represent) by the recruitment intelligence platform (10) based on the application submitted by the candidate;
  i) intimating the recruiter of the submission of application by the recruitment intelligence platform (10); and
  j) forwarding the candidate information by the recruiter to both internal and external customers via the recruitment intelligence platform (10).

Figure 3:
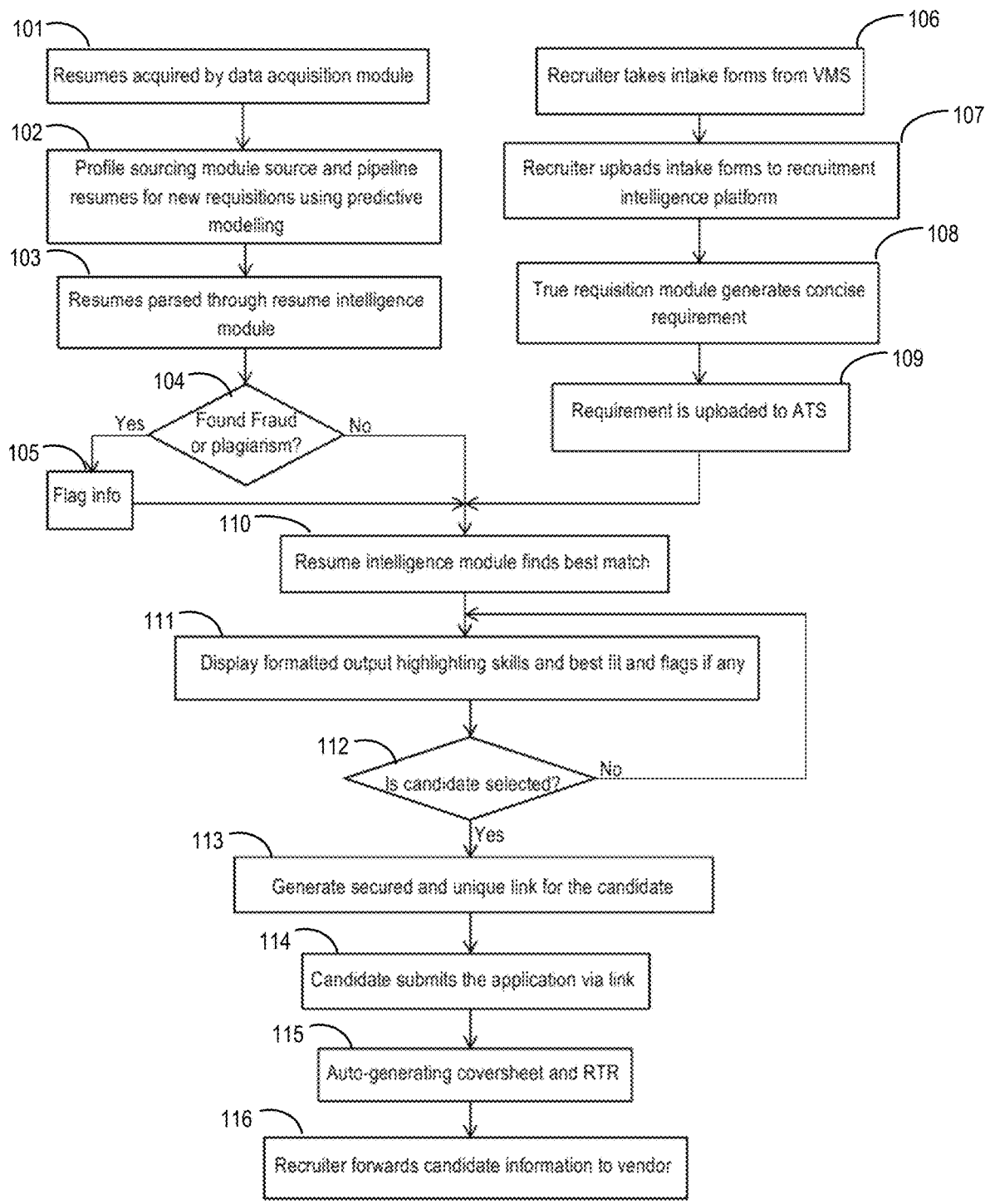
FIG. 3 is a flow chart depicting a method of performing an automated recruitment process by the intelligent recruitment management system, according to the present invention.

In an embodiment of the present invention as illustrated in FIG. 3, a flow chart depicting the method of performing an automated recruitment process by the intelligent recruitment management system is shown. A recruiter takes the job requirement (intake forms) from the VMS (106), and also other third parties, and uploads it to the true requisition module (12) of the recruitment intelligence platform (107). The AI-powered intelligent recruitment management system will produce a concise requirement by considering the historical data points (108). The requirement is then uploaded to the Applicant tracking system (ATS) (109). Sourcing process is carried out by the profile sourcing module (15) which maintains a constant pool of resumes downloaded from archives, internal databases that are accessible round the clock (102). Resumes are acquired from multiple sources including third-party resume platforms, resumes staged by sourcers, internal databases, and recruiter's historical archives.

After sourcing the candidates, their resumes are parsed through the resume intelligence module (13) of the recruitment intelligence platform (10). This resume parsing engine mines the candidate resume (103) and displays a formatted output not only highlighting the skills and the best fit but also cautioning frauds and plagiarism (110, 111). This platform (10) enables the recruiters not only find the best candidates for requisitions but also identifies red flags which might result in a business loss (104, 105). When the recruiter decides to move ahead with a candidate, they generate a secured and unique link for the required intake (112, 113). The candidate uses this mobile-friendly link to complete and submit the application (114) via the submission intelligence module (14) of the recruitment intelligence platform (10). This link also requires the candidate to answer any prescreen questions and also maintains the integrity by disabling "copy-paste" functionality. The application enables the recruiters while interacting with candidates to fully automate the existing manual due-diligence which includes capturing important candidate information, confidentiality agreement, relevant documents, representation rights, job description, answering prescreen questions, filled cover sheets along with supporting application information and a well-formatted and a tailor-made Resume for a job requirement. A coversheet and RTR (Right To Represent) is auto-generated based on the application submitted by the candidate (115). This information is intimated to the recruiter and the recruiter forwards the candidate information to the vendor (116) via the recruitment intelligence platform (10).

In the preferred embodiment of the present invention, wherein updates from all stages of the recruitment process is captured by the recruitment intelligence platform (10), keeping relevant stakeholders in the loop, including recruiters, candidates, vendors and hiring managers.

In the preferred embodiment of the present invention, wherein the recruitment intelligence platform (10) can also be accessed using a smart phone or a tablet.

It will be apparent to a person skilled in the art that the above description is for illustrative purposes only and should not be considered as limiting. Various modifications, additions, alterations, and improvements without deviating from the spirit and the scope of the invention may be made by a person skilled in the art.

The invention claimed is:

1. An intelligent recruitment management system for performing an automated recruitment process, the system comprising of: at least one processor configured to execute modules of a recruitment intelligence platform accessible via a network and hosted on a cloud computing environment, said modules of said recruitment intelligence platform comprising:

a true requisition module, that configures the at least one processor to parse data from intake forms and output a standardized result using Natural Language Processing (NLP) and mine and clean the data grouped based on skills, domain, experience and title, wherein said true requisition module configures the at least one processor to analyse previous requisitions and learn historical actions performed on them, wherein the true requisition module configures the at least one processor to generate a mobile-friendly secured and unique link for a processed intake form providing pre-screen questions in which a user can fill up an application, wherein the mobile-friendly secured and unique link expires after a set period of time, wherein the processed intake form includes pre-screen questions for the user to answer and disables copy-paste functionality, and wherein all information that is entered by the user via the mobile-friendly secured and unique link is routed through a secure server to be furnished to one or more prospective employers;

a sourcing intelligence module that configures the at least one processor to interpret an actual requirement of a job opening;

a resume intelligence module, that configures the at least one processor to mine resumes and display a formatted output, the formatted output displayed highlighting skills and best fit and cautioning frauds and plagiarism, wherein said resume intelligence module configures the at least one processor to interpret recruiters actions and retrains itself for higher accuracy by inducing machine learning/artificial intelligence via the sourcing intelligence module, wherein the resume intelligence module configures the at least one processor to parse the resumes to: uncover relevant skills, project experiences, a ratio of development experience to non-development experience, and spell checks; to uncover plagiarized content, ambiguity, suspicion of fake contents, years of gaps, missing information and employer relevant work history; and to create red flags when plagiarized content, ambiguity, suspicion of fake contents, years of gaps, missing information and employer relevant work history is found, and wherein the resume intelligence module configures the at least one processor to assign a score to each of the resumes indicating matches with a classification output stating whether each of the resumes is either reliable or not reliable;

a submission intelligence module, that configures the at least one processor to enable candidates to submit relevant information in a secure and automated manner via the mobile-friendly secured and unique link generated by said true requisition module, wherein the submission intelligence module configures the at least one processor to fully automate due-diligence including capturing: important candidate information, a confidentiality agreement, relevant documents, representation rights, job description, answering pre-screen questions, filled cover sheets, supporting application information, and a well-formatted and tailor made resume;

a profile sourcing module, that configures the at least one processor to invoke an RPA pipeline where a classification model configures the at least one processor to automatically determine job matches for various clients, prompt the recruiters to select relevant candidates, and invoke automated interest emails sent to profiles with an enabled link to apply for a job, wherein the interest emails are in the form of one of a direct application and a referral policy based on a status of a resume on file, wherein the profile sourcing module configures the at least one processor to use predictive modelling to source and pipeline resumes for new requisitions based on previous job requirement trends, wherein the profile sourcing module configures the at least one processor to maintain a constant pool of eligible resumes downloaded from archives and internal databases;

an analytics and reporting module that configures the at least one processor to utilize analytics to track progress and enables recruiters to keep track of every step of the automated recruitment process;

a data acquisition module that configures the at least one processor to:
  acquire resumes from multiple sources including third-party resume platforms, the resumes staged by sourcers, internal databases and recruiter's historical archives,
  extract data from the resumes, and
  copy the extracted data onto a common database for feeding to the recruitment intelligence platform.

2. A method of performing an automated recruitment process by an intelligent recruitment management system that includes at least one processor configured to execute a recruitment intelligence platform, the method performed by the at least one processor and comprising the steps of:

a) providing the recruitment intelligence platform accessible via a network and hosted on a cloud computing environment to recruiters and candidates;

b) receiving an intake form from a vendor management system or third party by the recruiter;

c) processing the intake form in a true requisition module of the recruitment intelligence platform, which generates an intelligent snapshot of the intake form, wherein the processing including parsing data from the intake form and outputting a standardized result using Natural Language Processing (NLP) and mining and cleaning the data grouped based on skills, domain, experience and title;

d) downloading resumes from internal databases, recruiter's historical archives or by sourcers and from third-party resume platforms;

e) processing the resumes by a resume intelligence module of the recruitment intelligence platform, which filter out resumes based on contents, fraud, plagiarism and generates a match factor with warnings (if any), wherein the resume intelligence module mines resumes and displays a formatted output, the formatted output displayed highlights skills and best fit and cautions frauds and plagiarism, wherein the resume intelligence module parses the resumes to: uncover relevant skills, project experiences, a ratio of development experience to non-development experience, and spell checks; to uncover plagiarized content, ambiguity, suspicion of fake contents, years of gaps, missing information and employer relevant work history; and to create red flags when plagiarized content, ambiguity, suspicion of fake contents, years of gaps, missing information and employer relevant work history is found, and wherein the resume intelligence module assigns a score to each of the resumes indicating matches with a classification output stating whether each of the resumes is either reliable or not reliable;

f) sending a mobile-friendly secured and unique link through the true requisition module to prospective candidates of matched resumes, which opens up an application portal with an auto-filled form, wherein the application portal with the auto-filled form provides pre-screen questions in which a user can fill up an application, wherein the mobile-friendly secured and unique link expires after a set period of time, wherein the auto-filled form includes pre-screen questions for the user to answer and disables copy-paste functionality, and wherein all information that is entered by the user via the mobile-friendly secured and unique link is routed through a secure server to be furnished to one or more prospective employers;

g) submitting the application by attaching relevant documents by the candidate through a submission intelligence module of the recruitment intelligence platform, wherein the submission intelligence module fully automating due-diligence including capturing: important candidate information, a confidentiality agreement, relevant documents, representation rights, job description, answering pre-screen questions, filled cover sheets, supporting application information, and a well-formatted and tailor made resume;

h) auto-generating a coversheet and RTR (Right To Represent) by the recruitment intelligence platform based on the application submitted by the candidate;

i) intimating the recruiter of the submission of application by the recruitment intelligence platform; and j) forwarding the candidate information by the recruiter to both its internal and external customers via the recruitment intelligence platform, wherein a profile sourcing module invoking an RPA pipeline where a classification model automatically determines job matches for various clients, prompts the recruiters to select relevant candidates, and invokes automated interest emails sent to profiles with an enabled link to apply for a job, wherein the interest emails are in the form of one of a direct application and a referral policy based on a status of a resume on file, wherein the profile sourcing module uses predictive modelling to source and pipeline resumes for new requisitions based on previous job requirement trends, wherein the profile sourcing module maintains a constant pool of eligible resumes downloaded from archives and internal databases, wherein an analytics and reporting module utilizes analytics to track progress and enables recruiters to keep track of every step of the automated recruitment process;

wherein a data acquisition module that:
  acquires resumes from multiple sources including third-party resume platforms, the resumes staged by sourcers, internal databases and recruiter's historical archives,
  extracts data from the resumes, and
  copies the extracted data onto a common database for feeding to the recruitment intelligence platform, wherein a sourcing intelligence module interpreting an actual requirement of a job opening.

3. The method of performing an automated recruitment process, as claimed in claim 2, wherein updates from all stages of the recruitment process is captured by the recruitment intelligence platform keeping relevant stakeholders in the loop, including recruiters, candidates, vendors and hiring managers.

4. The method of performing an automated recruitment process, as claimed in claim 2, wherein the resume intelligence module generates the match factor based on key skills from the intake form and historical data of previous requisitions.

5. The method of performing an automated recruitment process, as claimed in claim 2, wherein the recruitment intelligence platform can also be accessed using a smartphone or a tablet.

6. A computer program product comprising a non-transitory computer readable storage medium, said non-transitory computer readable storage medium storing computer program codes that comprise instructions executable by at least one processor, to perform method steps for an automated recruitment process, said method comprising the steps of:
  a) providing the recruitment intelligence platform accessible via a network and hosted on a cloud computing environment to recruiters and candidates;
  b) receiving an intake form from a vendor management system or third party by the recruiter;
  c) processing the intake form in a true requisition module of the recruitment intelligence platform, which generates an intelligent snapshot of the intake form, wherein the processing including parsing data from the intake form and outputting a standardized result using Natural Language Processing (NLP) and mining and cleaning the data grouped based on skills, domain, experience and title;
  d) downloading resumes from internal databases, recruiter's historical archives or by sourcers and from third-party resume platforms;
  e) processing the resumes by a resume intelligence module of the recruitment intelligence platform, which filter out resumes based on contents, fraud, plagiarism and generates a match factor with warnings (if any), wherein the resume intelligence module mines resumes and displays a formatted output, the formatted output displayed highlights skills and best fit and cautions frauds and plagiarism, wherein the resume intelligence module parses the resumes to: uncover relevant skills, project experiences, a ratio of development experience to non-development experience, and spell checks; to uncover plagiarized content, ambiguity, suspicion of fake contents, years of gaps, missing information and employer relevant work history; and to create red flags when plagiarized content, ambiguity, suspicion of fake contents, years of gaps, missing information and employer relevant work history is found, and wherein the resume intelligence module assigns a score to each of the resumes indicating matches with a classification output stating whether each of the resumes is either reliable or not reliable;
  f) sending a mobile-friendly secured and unique link through the true requisition module to prospective candidates of matched resumes, which opens up an application portal with an auto-filled form, wherein the application portal with the auto-filled form provides pre-screen questions in which a user can fill up an application, wherein the mobile-friendly secured and unique link expires after a set period of time, wherein the auto-filled form includes pre-screen questions for the user to answer and disables copy-paste functionality, and wherein all information that is entered by the user via the mobile-friendly secured and unique link is routed through a secure server to be furnished to one or more prospective employers;

k) submitting the application by attaching relevant documents by the candidate through a submission intelligence module of the recruitment intelligence platform,
g) wherein the submission intelligence module fully automating due-diligence including capturing: important candidate information, a confidentiality agreement, relevant documents, representation rights, job description, answering pre-screen questions, filled cover sheets, supporting application information, and a well-formatted and tailor made resume;
h) auto-generating a coversheet and RTR (Right To Represent) by the recruitment intelligence platform based on the application submitted by the candidate;
i) intimating the recruiter of the submission of application by the recruitment intelligence platform; and
j) forwarding the candidate information by the recruiter to both its internal and external customers via the recruitment intelligence platform,
wherein a profile sourcing module invoking an RPA pipeline where a classification model automatically determines job matches for various clients, prompts the recruiters to select relevant candidates, and invokes automated interest emails sent to profiles with an enabled link to apply for a job, wherein the interest emails are in the form of one of a direct application and a referral policy based on a status of a resume on file, wherein the profile sourcing module uses predictive modelling to source and pipeline resumes for new requisitions based on previous job requirement trends, wherein the profile sourcing module maintains a constant pool of eligible resumes downloaded from archives and internal databases,
wherein an analytics and reporting module utilizes analytics to track progress and enables recruiters to keep track of every step of the automated recruitment process;
wherein a data acquisition module:
  acquires resumes from multiple sources including third-party resume platforms, the resumes staged by sourcers, internal databases and recruiter's historical archives,
  extracts data from the resumes, and
  copies the extracted data onto a common database for feeding to the recruitment intelligence platform,
wherein a sourcing intelligence module interpreting an actual requirement of a job opening.

* * * * *